United States Patent
Rath et al.

(10) Patent No.: US 6,518,373 B1
(45) Date of Patent: Feb. 11, 2003

(54) METHOD FOR PRODUCING HIGHLY REACTIVE POLYISOBUTENES

(75) Inventors: Hans Peter Rath, Grünstadt (DE); Dieter Hahn, Carlsberg (DE); Gerhard Sandrock, Frankenthal (DE); Frans van Deyck, Essen (BE); Bart Vander Straeten, Hever (BE); Eddy De Vree, Stabroek (BE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/111,453

(22) PCT Filed: Oct. 27, 2000

(86) PCT No.: PCT/EP00/10587

§ 371 (c)(1),
(2), (4) Date: Apr. 25, 2002

(87) PCT Pub. No.: WO01/30868

PCT Pub. Date: May 3, 2001

(30) Foreign Application Priority Data

Oct. 28, 1999 (DE) .......................... 199 52 031

(51) Int. Cl.[7] .............................. C08F 2/04; C08F 10/10
(52) U.S. Cl. ........................ 526/70; 526/68; 526/237; 526/348.7
(58) Field of Search ............................ 526/68, 70, 237, 526/348.7

(56) References Cited

U.S. PATENT DOCUMENTS

| 4,152,499 A | 5/1979 | Boerzel et al. ............... 526/52 |
| 5,286,823 A | 2/1994 | Rath ........................... 526/237 |
| 5,408,018 A | 4/1995 | Rath ........................... 526/237 |
| 5,910,550 A | 6/1999 | Rath ........................... 526/237 |
| 5,962,604 A | 10/1999 | Rath ........................... 526/65 |
| 6,407,186 B1 * | 6/2002 | Rath et al. .................... 526/69 |

FOREIGN PATENT DOCUMENTS

| WO | WO 99/31151 | 6/1999 |

* cited by examiner

*Primary Examiner*—Fred Teskin
(74) *Attorney, Agent, or Firm*—Keil & Weinkauf

(57) ABSTRACT

Polyisobutenes are prepared by the continuous preparation process, by polymerizing isobutene in the presence of a catalyst comprising boron trifluoride and at least one cocatalyst in an inert organic solvent, a) a part of the reaction mixture obtained thereby being discharged continuously from the polymerization reactor, b) the catalyst being separated from the discharge and/or being deactivated in the discharge, and c) the solvent and any unconverted isobutene being separated from the discharge and recycled to the polymerization reactor, wherein the recycled solvent and, if present, the isobutene are subjected to a wash with water before recycling to the polymerization reactor and are then dried.

9 Claims, 1 Drawing Sheet

METHOD FOR PRODUCING HIGHLY REACTIVE POLYISOBUTENES

The present invention relates to a process for the continuous preparation of polyisobutenes by polymerizing isobutene in the presence of a catalyst comprising boron trifluoride and at least one cocatalyst in an inert organic solvent.

High molecular weight polyisobutenes having molecular weights up to several 100,000 Dalton have long been known. These polyisobutenes are generally prepared with the aid of Lewis acid catalysts, such as aluminum chloride, alkylaluminum chlorides or boron trifluoride and generally have not less than 10 mol % of terminal double bonds (vinylidene groups) and a molecular weight distribution (dispersity) of from 2 to 5.

The highly reactive polyisobutenes, which as a rule have average molar masses of from 500 to 5,000 Dalton and contain more than 60, preferably more than 80, mol % of terminal vinylidene groups, must be distinguished from these conventional polyisobutenes. In the context of the present application, terminal vinylidene groups or terminal double bonds are understood as meaning those double bonds whose position in the polyisobutene macromolecule is described by the formula,

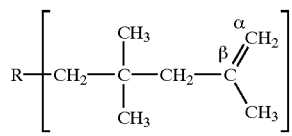

where R is the polyisobutene radical shortened by two isobutene units. The type and the proportion of the double bonds present in the polyisobutene can be determined with the aid of $^{13}$C-NMR spectroscopy. Such highly reactive polyisobutenes are used as intermediates for the preparation of additives for lubricants and fuels, as described, for example, in DE-A 27 02 604. The terminal vinylidene groups have the highest reactivity, whereas the double bonds present further toward the interior of the macromolecules exhibit in the usual functionalization reactions only very little reactivity, if any at all, depending on their position in the macromolecule. The proportion of terminal vinylidene groups in the molecule is therefore the most important quality criterion for this type of polyisobutene.

Further quality criteria for polyisobutene are their average molecular weight and the molecular weight distribution (also referred to as dispersity) of the macromolecules contained in the polyisobutene. In general, polyisobutenes having average molecular weights ($M_n$) of from 500 to 50,000 Dalton are desirable. Molecular weights of from 500 to 5,000, preferably from 600 to 3,000, in particular from 700 to 2,500, Dalton are preferred for the preparation of polyisobutenes used as fuel additives, owing to their better efficiency.

Furthermore, a narrow molecular weight distribution of the polyisobutene molecules is desirable in order to reduce the proportion of undesired, relatively low molecular weight or high molecular weight polyisobutenes in the product produced and thus to improve its quality.

Various polymerization reactions of isobutene under catalysis by various boron trifluoride complexes are known.

EP 0 807 641 A2 describes a process for the preparation of highly reactive polyisobutene having an average molecular weight of more than 5,000 and up to 80,000 Dalton and containing at least 50 mol % of terminal vinylidene groups. The cationic polymerization of isobutene or isobutene-containing hydrocarbons is carried out in the liquid phase in the presence of boron trifluoride complex catalysts at below 0° C. and from 0.5 to 20 bar, in one stage at a steady-state isobutene concentration of from 20 to 80% by weight. The boron trifluoride complex catalysts can be premolded before they are used or can be produced in situ in the polymerization reactor. The boron trifluoride concentration is from 50 to 500 ppm.

EP 0 628 575 A1 describes a process for the preparation of highly reactive polyisobutene containing more than 80 mol % of terminal vinylidene groups and having an average molecular weight of from 500 to 5,000 Dalton by cationic polymerization of isobutene or isobutene-containing hydrocarbons in the liquid phase in the presence of boron trifluoride and secondary alcohols of 3 to 20 carbon atoms. In addition to the separate preparation of the boron trifluoride complex with subsequent introduction into the reaction stream, production of the complex in situ is also proposed. The process is preferably operated with establishment of a steady-state monomer concentration in the reaction medium, which as a rule is set in the range from 0.2 to 50, preferably from 0.2 to 5, % by weight, based on the total polymerization mixture.

WO 99/31151 describes a process for the preparation of highly reactive low molecular weight polyisobutene, in which some of the boron trifluoride complex catalyst is recovered by separating the reactor discharge into a product-rich phase and a catalyst-rich phase and recycling the catalyst-rich phase to the polymerization reactor. However, this procedure makes it more difficult to carry out the reaction.

However, the reaction must be carried out precisely in order to ensure the product quality, in particular the uniformity of the molecular weight (i.e. for narrow molecular weight distribution) and a high content of vinylidene double bonds.

It is an object of the present invention to provide a continuous process for the preparation of polyisobutene having the generic features of the preamble of claim 1, in which the reaction can be carried out more precisely.

We have found that this object is achieved by a process for the continuous preparation of polyisobutene by polymerizing isobutene in the presence of a catalyst comprising boron trifluoride and at least one cocatalyst in an inert organic solvent, a) a part of the reaction mixture obtained thereby being discharged continuously from the polymerization reactor, b) the catalyst being separated from the discharge and/or being deactivated in the discharge and, c) the solvent and any unconverted isobutene being separated from the discharge and recycled to the polymerization reactor, wherein the recycled solvent and, if present, the isobutene are subjected to a wash with water before the recycling to the polymerization reactor and, if required, are then dried.

The separation of the solvent and of any unconverted isobutene from the discharge is effected as a rule by distilling off the solvent, isobutene and other volatile components also distilling off. As a result of the novel washing of the solvent with water before the recycling, the residues of water-soluble cocatalysts and traces of fluorine-containing decomposition products still present are removed in a simple manner and with high efficiency.

The washing of the solvent before recycling can be carried out in one stage or a plurality of stages. In a one-stage procedure, as a rule the solvent separated from the discharge is mixed with a sufficient amount of water in a mixer and a phase separation is then carried out in a separation vessel. For the multistage wash, these operations can be repeated several times in the manner of a cascade. Preferably, the multistage wash is carried out in an extraction column.

For washing the solvent, as a rule the solvent/water ratio of from 20:1 to 1:2, in particular from 10:1 to 1:1 (v/v) is chosen. In a one-stage wash, the ratio of solvent to water is particularly preferably about 1:1 (v/v); in a multistage wash or in the extraction using an extraction column, the solvent/water ratio is preferably not less than 2:1 and preferably from 2:1 to 1:10.

The wash is carried out as a rule at from 5 to 80° C., preferably from 10 to 50° C. A wash under superatmospheric pressure is also suitable.

The wash water produced during washing of the solvent (and of any unconverted isobutene) can be removed as wastewater. Since the pollution of the wash water with residues of water-soluble cocatalyst and fluorine-containing decomposition products is comparatively low, the wash water can advantageously be reused in the novel process before it is disposed of as wastewater. The wash water is, for example, suitable for deactivating the catalyst in the reaction discharge with simultaneous extraction of the catalyst decomposition products from the reaction discharge, as described in more detail further below. This second use of the wash water leads on the one hand to a saving of fresh water and a reduction in the amount of wastewater in the total process. A further advantage is the reduction of solvent and isobutene losses, which are attributable to the fact that the solvent and isobutene are slightly soluble in water. Since the wash water is already saturated with solvent (and possibly isobutene) after the washing of the recycled solvent (and any isobutene), there is no further passage of solvent and any isobutene into the wash water phase in the catalyst deactivation stage, so that the losses of solvent and any isobutene via the wastewater are reduced.

After the solvent has been separated off, the residue which contains the desired polyisobutene is worked up in a conventional manner. For this purpose, the residue is subjected, for example, to further washing stages with water or alcoholic solvents, e.g. methanol, or solvent/water mixtures, in order to remove catalyst residues. Traces of solvent and of water as well as volatile oligomers of isobutene are removed by conventional methods, for example by evaporation in an annular gap evaporator or by extrudate devolatilization.

The novel process is a continuous process. Measures for continuously polymerizing isobutene in the presence of catalysts comprising boron trifluoride and at least one cocatalyst in inert organic solvents to give polyisobutene are known per se. In a continuous process, a part of the reaction mixture formed in the polymerization reactor is discharged continuously. Of course, an amount of starting material which corresponds to the discharge is fed continuously to the polymerization reactor. The ratio of the amount of substance present in the polymerization reactor to the amount which is discharged is determined by the circulation/feed ratio, which in the continuous polymerization of isobutene to polyisobutene is as a rule from 1000:1 to 1:1, according to the invention preferably from 500:1 to 5:1, in particular from 50:1 to 200:1 (v/v). The average residence time of the isobutene to be polymerized in the polymerization reactor may be from 5 seconds to several hours. Residence times of from 1 to 30, in particular from 2 to 20, minutes are preferred. The polymerization of the isobutene is effected in the reactors customary for the continuous polymerization, such as stirred kettles, tubular reactors, tube-bundle reactors and loop reactors, loop reactors, i.e. tube (-bundle) reactors having stirred kettle characteristics, being preferred. Tubular reactors having tube cross-sections which lead to turbulence in sections are particularly advantageous.

The novel process is carried out as a rule at a polymerization temperature of from −60° C. to +40° C., preferably below 0° C., particularly preferably from −50° C. to −40° C., especially from −10° C. to −30° C. The heat of polymerization is correspondingly removed with the aid of a cooling apparatus. This may be operated, for example, with liquid ammonia as coolant. Another possibility for removing the heat of polymerization is by evaporative cooling. The heat liberated is removed by evaporating the isobutene and/or other readily volatile components of the isobutene feedstock or any readily volatile solvent. The novel polymerization process is preferably carried out under isothermal conditions, i.e. the temperature of the liquid reaction mixture in the polymerization reactor has a constant value and changes only to a small extent, if at all, during the operation of the reactor.

The concentration of the isobutene in the liquid reaction phase is as a rule from 0.2 to 50, preferably from 0.5 to 20, in particular from 1 to 10, % by weight, based on the liquid reaction phase. In the preparation of polyisobutenes having number-average molecular weights $M_n$ of from 500 to 5,000 Dalton, an isobutene concentration of from 1 to 20, in particular from 1.5 to 15, % by weight is preferably employed. In the preparation of polyisobutenes having a number-average molecular weight $M_n$ above 5,000 Dalton, an isobutene concentration of from 4 to 50% by weight is preferably employed.

The isobutene conversion can in principle be established as desired. However, it is self evident that the cost-efficiency of the process is doubtful at very low isobutene conversions whereas the danger of the double bond shifts increases and shorter reaction times and improved heat removal are required at very high isobutene conversions of more than 99%. For these reasons, the isobutene conversion is usually carried out to values in the range from 20 to 99%. Isobutene conversions from 70 to 98% are particularly preferred.

Suitable feedstocks for the novel process are isobutene itself and isobutene-containing $C_4$-hydrocarbon streams, for example refined $C_4$ fractions, $C_4$ cuts from isobutene dehydrogenation and $C_4$ cuts from steam crackers and FCC crackers (FCC: Fluid Catalysed Cracking), provided that they have been substantially freed from 1,3-butadiene contained therein. $C_4$-hydrocarbon streams suitable according to the invention contain, as a rule, less than 500 ppm, preferably less than 200 ppm, of butadiene. The presence of 1-butene and cis- and trans-2-butene is substantially non-critical for the novel process and does not lead to loss of selectivity. Typically, the concentration in the $C_4$-hydrocarbon streams is from 40 to 60% by weight. When $C_4$-cuts are used as feedstock, the hydrocarbons other than isobutene assume the role of an inert solvent. The isobutene feedstock may contain small amounts of contaminants, such as water, carboxylic acids or mineral acids without resulting in critical reductions in yield or in selectivity during the polymerization. This results in lower alcohol/ether consumption, which changes the abovementioned molar ratios in favor of $BF_3$. It is expedient to avoid an accumulation of these impurities in the plant, by removing such pollutants, for example by adsorption on solid adsorbents, such as active carbon, molecular sieves or ion exchangers, from the isobutene-containing feedstock.

Solvents or solvent mixtures which are suitable for the novel process are those which are inert to the reagents used. Suitable solvents are, for example, saturated hydrocarbons, such as butane, pentane, hexane, heptane or octane, e.g. n-hexane, isooctane, cyclobutane or cyclopentane, halogenated hydrocarbons, such as methyl chloride, dichloromethane or trichloromethane, and mixtures of the abovementioned compounds. Before they are used in the novel process, the solvents are preferably freed from impurities, such as water, carboxylic acids or mineral acids, for example by adsorption on solid adsorbents, such as active carbon, molecular sieves or ion exchangers.

In the novel process, the polymerization is carried out in the presence of boron trifluoride complex catalysts. These are understood as meaning catalysts comprising boron trifluoride and at least one cocatalyst. Suitable cocatalysts are as a rule oxygen-containing compounds. Suitable oxygen-containing compounds in addition to water are organic compounds of up to 30 carbon atoms which contain at least one oxygen atom bonded to carbon. Examples of these are $C_1$–$C_{10}$-alkanols and cycloalkanols, $C_2$–$C_{10}$-diols, $C_1$–$C_{20}$-carboxylic acids, $C_4$–$C_{12}$-carboxylic anhydrides and $C_2$–$C_{20}$-dialkyl ethers. Preferred among these are monohydric alkanols of from 1 to 20, in particular 1 to 4, carbon atoms, which, if required, can be used together with the $C_1$–$C_{20}$-dialkyl ethers. Molar ratios of boron trifluoride to oxygen-containing compound of from 1:1 to 1:10, in particular from 1:1.1 to 1:5, especially from 1:1.2 to 1:2.5 are preferred according to the invention in boron trifluoride complex catalysts. The $BF_3$ concentration in the reactor will as a rule vary in the range from 0.01 to 1, in particular from 0.02 to 0.7, especially from 0.03 to 0.5, % by weight, based on the liquid reaction phase.

In the novel process, the oxygen-containing compound in the boron trifluoride complex catalyst particularly preferably comprises at least one monohydric, secondary alcohol A of 3 to 20 carbon atoms. Examples of suitable secondary alcohols are the following: isopropanol, 2-butanol, and furthermore sec-pentanols, sec-hexanols, sec-heptanols, sec-octanols, sec-nonanols, sec-decanols or sec-tridecanols. In addition to monohydric, secondary alcohols, it is also possible to use (poly)etherols of propene oxide and of butene oxide according to the invention. 2-Butanol and in particular isopropanol are preferably used.

The boron trifluoride complexes can be preformed in separate reactors before they are used in the novel process, temporarily stored on their formation and metered into the polymerization apparatus according to demand. The $BF_3$ complex catalysts are prepared as a rule by passing $BF_3$ into the cocatalyst or into a solution of the cocatalyst in one of the abovementioned inert organic solvents at from −60 to +60° C., preferably from −30 to +20° C. The activity of the catalyst can be manipulated by adding further cocatalysts.

In another, preferred variant, the boron trifluoride complexes are produced in situ in the polymerization apparatus. In this procedure, the respective cocatalyst is, if required, fed together with a solvent into the polymerization apparatus and boron trifluoride is dispersed in the required amount in this mixture of the reactants. Here, the boron trifluoride and the cocatalysts react to give the boron trifluoride complex. Instead of an additional solvent, isobutene or the reaction mixture comprising unconverted isobutene and polyisobutene can act as a solvent in the in situ production of the boron trifluoride catalyst complex.

In a preferred embodiment, first a complex of dialkyl ether B and $BF_3$ is prepared separately or in the solvent feed to the reactor and only thereafter combined with the secondary alcohol A in the complex feed or solvent feed to the reactor or in the reactor itself. Consequently, the energy of the complex formulation can be removed without harmful byproduct formation during the production of the alcohol complex. Moreover, this procedure permits the simple manipulation of the catalyst activity via the ratio of boron trifluoride to alcohol.

Gaseous boron trifluoride is expediently used as raw material for the preparation of the boron trifluoride complexes, it being possible to use technical-grade boron trifluoride still containing small amounts of sulfur dioxide and $SiF_4$ (purity: 96.5% by weight), but preferably high-purity boron trifluoride (purity: 99.5% by weight).

The reaction mixture discharged from the polymerization reactor still contains a polymerizable isobutene, $BF_3$ and cocatalyst. As a rule, the polymerization therefore also continues in the discharge. As a result of this, the polyisobutene formed in the polymerization reactor may change in a disadvantageous manner with respect to molecular weight, molecular weight distribution and terminal group content. To prevent further reaction, the polymerization is therefore usually stopped by deactivating the catalyst. The deactivation can be effected, for example, by adding water, alcohols, acetonitrile, ammonia or aqueous solutions of mineral bases or by passing the discharge into one of the abovementioned media. The deactivation is preferably carried out using water, preferably at from 1 to 60° C. (water temperature). During the deactivation with water the deactivation in the narrow sense of the word (by formation of a catalytically inactive $BF_3$-water complex) is accompanied by hydrolysis of the boron trifluoride to water-soluble hydrolysis products, such as boric acid and hydrogen fluoride, which pass over into the aqueous phase and are thus removed for the most part from the orgaic phase. After phase separation into an organic phase and into an aqueous phase, if required, the solvent is separated from the polyisobutene in the discharge thus deactivated, by evaporation and condensation or by controlled distillation, and is further treated in the manner described above.

In a preferred embodiment of the novel process, the boron trifluoride complex catalyst is substantially separated from the discharge and recycled to the polymerization reaction. The separation and recycling of the catalyst from the discharge of the polymerization reaction is disclosed in WO 99/31151, which is hereby incorporated in full by reference. For separation of the catalyst from the discharge, preferably boron trifluoride complex catalysts having limited solubility are used and/or the reaction mixture is cooled to, for example, from 5 to 30, preferably from 10 to 20, Kelvin below the reactor temperature.

On separating the catalyst from the reactor discharge, it is advisable to reduce the isobutene concentration of the discharge to below 2, preferably 1, in particular below 0.5, % by weight, based on the discharge, beforehand. As a rule, the reactor discharge is therefore subjected to a further polymerization stage before the catalyst is separated off. The multistage isobutene polymerization described in WO 96/40808, in which residual isobutene of the main reactor is consumed down to about 0.5% in the downstream reactor, is a preferred procedure for the novel process. Preferably, this second polymerization stage is operated at the same temperature as the first polymerization stage or at a lower polymerization temperature than the first polymerization stage. As a rule, the temperature difference is from 0 to 20 Kelvin, preferably from 0 to 10 Kelvin.

The downstream reaction, in particular the cooled downstream reaction, results in more complex separating out. The solubility of the complex decreases at least by a power of 10, and in particular if the temperature reduction is also effected. Here, the catalyst is obtained in the form of finely divided droplets, which as a rule are rapidly transformed into a coherent phase. The complex droplets or the coherent phase have or has a substantially high density than the polymer solution. As a rule, they can therefore be separated from the polymer-rich, catalyst-poor product phase with the aid of precipitators, separators or other collecting containers. If the catalyst is obtained only in the form of very finely divided droplets which are difficult to separate off, the conventional measures for droplet enlargement, for example coalescing filters, can be used. Methods for this purpose are described, for example, in WO 99/31151.

The formation of a coherent catalyst phase is however not essential for recycling the catalyst. A phase in which the complex is still distributed in disperse form can, if required, also be fed to the reactor. The concentrated and/or isolated catalyst is then fed to the polymerization as a rule without further purification or, in the case of a multistage polymerization, as a rule to the first polymerization stage. Since as a rule there are certain reductions in activity on isolating the catalyst, said reductions are compensated by adding small amounts of catalyst, for example from 1 to 30, preferably from 3 to 20, in particular from 5 to 10, % by weight, based on the amounts of complex which are required in a straight path. As a rule, it is therefore possible to recycle from 40 to 95%, preferably from 70 to 90%, of the catalyst.

The polymer-rich product phase separated off is generally homogeneous and contains only small amounts of soluble catalyst fractions. These are deactivated in the manner described above, preferably with water. Thereafter, the solvent is separated from the product in the manner described above and is subjected to the novel wash. In this embodiment, it is also possible to absorb the residues of the dissolved complex on nitrile-containing materials, for example according to EP-A-791 557, or nitrile-modified silica gel.

The novel process enables good control of the isobutene polymerization and permits specific preparation of highly reactive polyisobutenes having a number-average molecular weight $M_n$ of from 500 to 50,000 Dalton and containing at least 60 mol % of terminal vinylidene groups. The novel process has proven particularly useful in the preparation of polyisobutenes having a number-average molecular weight $M_n$ of from 500 to 5,000, in particular from 700 to 2,500, and containing at least 80 mol %, based on all terminal groups, of vinylidene groups. At the same time, a better molecular uniformity of the polyisobutene, characterized by the ratio of weight average molecular weight $\overline{M}_w$ to number average molecular weight $M_n$ (=dispersity $D=\overline{M}_w/M_n$), is achieved. Typically, the novel process enables production of polyisobutenes in the stated molecular weight range with an $M_w/M_n \leq 2.5$, preferably $\leq 2.0$, and in particular $\leq 1.8$. In contrast to the prior art processes, these values are also achieved in the case of solvent recycling. Furthermore, in contrast to the prior art processes, the content of reactive terminal groups does not decrease below 60, preferably 80, mol % on recycling the solvent. In particular, the process makes it possible to maintain the abovementioned quality features for polyisobutene having molecular weights of from 500 to 5,000. This presumably is due to better control of the polymerization, which has possibly been complicated to date by catalyst traces and/or cocatalyst traces in the recycled solvent.

BRIEF DESCRIPTION OF THE DRAWING

The diagram shown in FIG. 1 is intended to illustrate the invention without restricting it.

Figure 1:
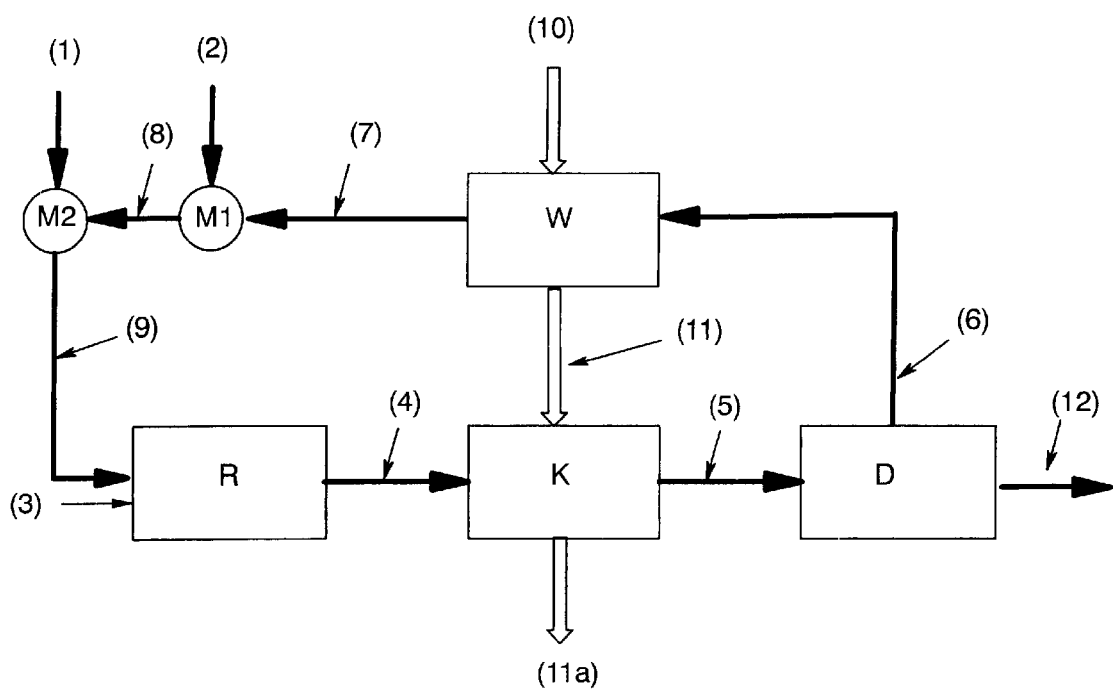
FIG. 1 shows a preferred embodiment of a novel process in the form of a block diagram. The solvent stream (6) recovered by working up by distillation is subjected to a novel wash with fresh water (10) in a washer W. Fresh solvent (2) is added in M1 to the solvent stream (7) worked up in this manner and thereafter fresh isobutene is added to said solvent stream in M2. The stream (9) thus obtained and comprising solvent and isobutene is fed to the reactor R. At the same time, the complex catalyst (3), optionally in the form of boron trifluoride and cocatalyst, via separate feeds, or in the form of a preformed catalyst, is fed to the reactor. The wash water (11) from the novel water wash W is added to the reactor discharge (4) in a mixing vessel K for deactivating the catalyst. The wash water (11a) is separated off. The product-containing organic phase (5) is subjected to a distillation (D) in which the main amount of the solvent used and any further readily volatile components are separated off and are fed as a solvent stream (6) to the novel wash (W). The bottom product (12) of the distillation (D) essentially comprises polyisobutene, which, if required, is furthermore subjected to extrudate devolatilization at elevated temperatures (not shown) for removing sparingly volatile components.

We claim:

1. A process for the continuous preparation of polyisobutene by polymerizing isobutene in the presence of a catalyst comprising boron trifluoride and at least one cocatalyst in an inert organic solvent, and
   a) a part of the reaction mixture obtained thereby being discharged continuously from the polymerization reactor,
   b) the catalyst being separated from the discharge and/or being deactivated in the discharge, and
   c) the solvent and any unconverted isobutene being distilled off from the discharge and recycled to the polymerization reactor,
      wherein the distilled-off solvent and, if present, the isobutene are subjected to a wash with water before the recycling to the polymerization reactor and, Optimally then dried.

2. A process as claimed in claim 1, wherein the wash with water is effected in a plurality of stages.

3. A process as claimed in claim 1, wherein, in the wash with water, the solvent/water ratio is chosen to be from 1:1 to 1:0.1.

4. A process as claimed in claim 1, wherein the discharged amount of reaction mixture corresponds to a circulation/feed ratio of from 1000:1 to 10:1.

5. A process as claimed in claim 1, wherein, to remove the catalyst from the discharge
   b1) the discharge is separated into a catalyst-enriched catalyst phase and into a polyisobutene- and solvent-enriched product phase and
   b2) the catalyst phase is recycled to the reactor, if required after addition of boron trifluoride and cocatalyst.

6. A process as claimed in claim 5, wherein the residual content of isobutene in the discharge is less than 2% by weight.

7. A process as claimed in claim 5, wherein the catalyst residues remaining in the discharge after the catalyst has been separated off are deactivated by adding water.

8. A process as claimed in claim 1, wherein the wash water produced during washing of the solvent is used to deactivate and/or extract the catalyst in the reaction discharge.

9. A process as claimed in claim 1, wherein the polyisobutene is a highly reactive polyisobutene having an average molecular weight $M_n$ of from 500 to 5,000 Dalton and containing more than 80 mol % of terminal double bonds.

* * * * *